(12) United States Patent
Ahmadi

(10) Patent No.: US 8,284,725 B2
(45) Date of Patent: Oct. 9, 2012

(54) TECHNIQUES TO NEGOTIATE CAPABILITIES BETWEEN NETWORKED DEVICES

(75) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 12/589,938

(22) Filed: Oct. 30, 2009

(65) Prior Publication Data

US 2011/0103314 A1    May 5, 2011

(51) Int. Cl.
*H04W 4/00* (2009.01)
(52) U.S. Cl. ............ 370/329; 455/422.1; 455/450; 455/562.1; 370/254
(58) Field of Classification Search ........... 455/422.1, 455/515, 562.1, 450; 370/329, 230, 254
See application file for complete search history.

(56) References Cited

U.S. PATENT DOCUMENTS

| | | | |
|---|---|---|---|
| 2002/0193146 A1 | 12/2002 | Wallace et al. | |
| 2006/0056316 A1* | 3/2006 | Chandra et al. | 370/254 |
| 2007/0076639 A1* | 4/2007 | Chou | 370/310 |
| 2007/0115816 A1* | 5/2007 | Sinivaara | 370/230 |
| 2009/0124290 A1* | 5/2009 | Tao et al. | 455/562.1 |
| 2010/0027468 A1* | 2/2010 | Rajadurai et al. | 370/328 |
| 2010/0067467 A1* | 3/2010 | Cho et al. | 370/329 |
| 2010/0254336 A1* | 10/2010 | Lee et al. | 370/329 |
| 2011/0026475 A1* | 2/2011 | Lee et al. | 370/329 |
| 2011/0026495 A1* | 2/2011 | Lee et al. | 370/335 |
| 2011/0039593 A1* | 2/2011 | Lee et al. | 455/515 |
| 2011/0286420 A1* | 11/2011 | Cho et al. | 370/329 |

FOREIGN PATENT DOCUMENTS

KR  10-2009-0043199 A   5/2009
WO  2008/154586 A1   12/2008

OTHER PUBLICATIONS

International Search Report and Written Opinion received for PCT Patent Application No. PCT/US2010/046346, mailed on Feb. 28, 2011, 10 pages.
"Section 16.2.3.4 AAI_SBC-REQ", Part 16: Air Interface for Fixed and Mobile Broadband Wireless Access Systems, IEEE P802.16m/D3, Dec. 8, 2009, pp. 50.
"Section 16.2.3.5 AAI_SBC-RSP", Part 16: Air Interface for Fixed and Mobile Broadband Wireless Access Systems, IEEE P802.16m/D3, Dec. 8, 2009, pp. 50-51.
"Section 16.2.15.4 Basic Capability Negotiation", Part 16: Air Interface for Fixed and Mobile Broadband Wireless Access Systems, IEEE P802.16m/D3, Dec. 8, 2009, pp. 243-244.
"Air Interface for Broadband Wireless Access Systems," IEEE Standard for Local and metropolitan area networks, IEEE Std 802.16™-2009 (Revision of IEEE Std 802.16-2004), IEEE Computer Society and the IEEE Microwave Theory and Techniques Society, Sponsored by the LAN/MAN Standards Committee, 3 Park Avenue, New York, USA, May 29, 2009, pp. 333-336.

* cited by examiner

*Primary Examiner* — Jinsong Hu
*Assistant Examiner* — Nathan Taylor
(74) *Attorney, Agent, or Firm* — Glen B. Choi

(57) ABSTRACT

Techniques for signaling capabilities of a mobile station using a capabilities index as well as a fall back mechanism in case of system failure. The capabilities index can represent multiple capabilities of the mobile station. A mobile station can signal to the base station the mobile station's capabilities using a capability index. A base station can interpret the capability index from the mobile station to learn the capabilities of the mobile station. The base station can signal to the mobile station the base station's supported capabilities using a capabilities index. The capabilities utilized between the base station and mobile station are set according to the base station's signaled capabilities.

17 Claims, 3 Drawing Sheets

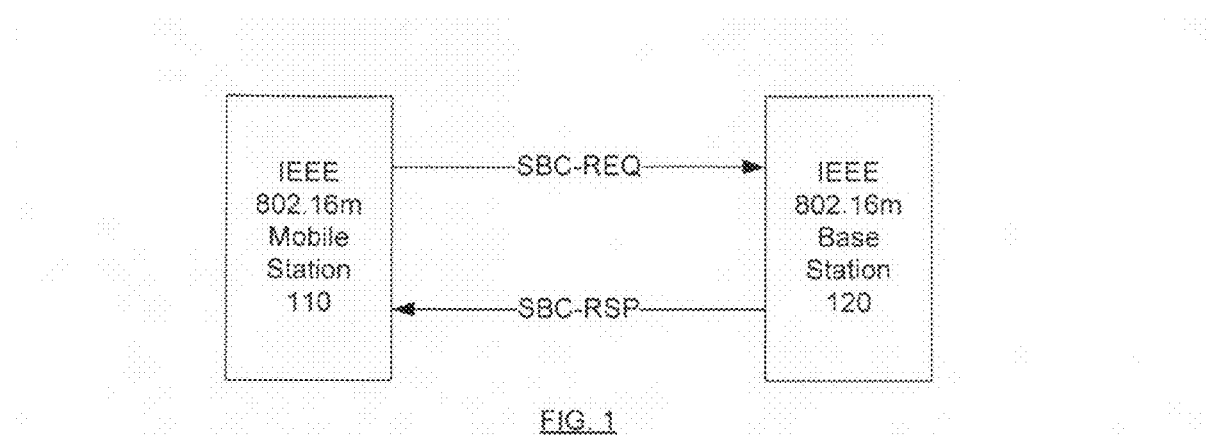
FIG. 1
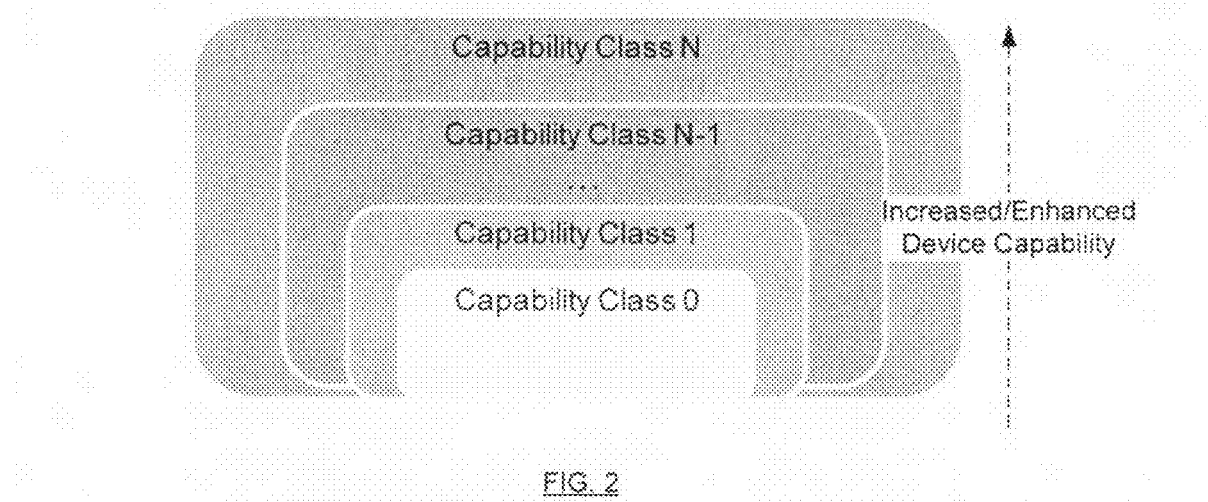
FIG. 2
| Syntax | Size (bit) | Notes |
|---|---|---|
| SBC-REQ_Message_Format() { | — | — |
| Management Message Type = 26 | 8 | — |
| TLV Encoded Information | variable | TLV-specific |
| } | — | — |
FIG. 3

| Syntax | Size (bit) | Notes |
|---|---|---|
| SBC-RSP_Message_Format() { | — | — |
|    Management Message Type = 27 | 8 | — |
|    TLV Encoded Attributes | variable | TLV-specific |
| } | — | — |

US 8,284,725 B2

TECHNIQUES TO NEGOTIATE CAPABILITIES BETWEEN NETWORKED DEVICES

CROSS REFERENCE TO RELATED APPLICATIONS

This application claims the benefit of U.S. Provisional Application No. 61/275,266, filed Aug. 24, 2009.

FIELD

The subject matter disclosed herein relates generally to techniques for a mobile station to negotiate capabilities with a base station.

RELATED ART

IEEE Std 802.16-2009 describes capability negotiation procedures in which a mobile station and base station exchange MAC management messages during network entry or re-entry. Section 6.3.2.3.23 of IEEE Std. 802.16-2009 describes a mobile station using variable length messages to request capabilities and a base station using variable length messages indicate a capability response. Immediately after completion of ranging, the mobile station informs the base station of the mobile station's basic capabilities by transmitting an SBC-REQ message (SS basic capability request) with each of its capabilities set to "on" (see FIG. 75 of IEEE Std 802.16-2009). The base station responds with an SBC-RSP message (SS basic capability response) with the intersection of the mobile station's and the base station's capabilities set to "on" (see FIG. 76 and FIG. 77 of IEEE Std 802.16-2009).

However, there are various potential issues with the capability negotiation procedures of IEEE Std 802.16-2009. The capability negotiation MAC management messages are very large in size. Although, the resulting MAC messages are often segmented into multiple MAC Protocol Data Units (MAC PDU), the probability of error under severe channel conditions especially for cell-edge users can be excessively high, resulting in increased network entry/re-entry delays as well as higher control-plane latency.

BRIEF DESCRIPTION OF THE DRAWINGS

Embodiments of the present invention are illustrated by way of example, and not by way of limitation, in the drawings and in which like reference numerals refer to similar elements.

FIG. 1 shows a wireless communication system involved in a capability configuration session, in accordance with an embodiment.

FIG. 2 depicts an order of capability classes, from class 0 to higher class number N, where N≧0.

FIGS. 3 and 4 respectively depict SBC-REQ and SBC-RSP message formats from IEEE Std 802.16-2009.

FIG. 5 depicts a process to negotiate capabilities between a mobile station and base station in accordance with an embodiment.

DETAILED DESCRIPTION

Figures 4, 5:
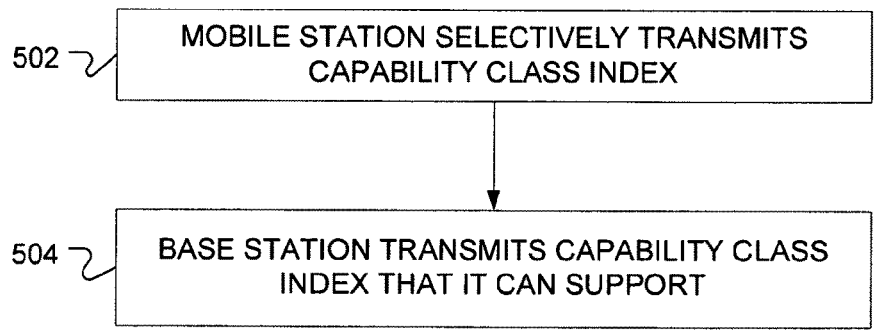

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, and 802.11n.

Various embodiments provide for capability negotiation between a mobile station (MS) and base station (BS) during network entry/re-entry or handover by using predefined capability classes and capability class indices to indicate capabilities. Type/Length/Value (TLV) coded or Abstract Syntax Notation One (ASN.1) coded MAC management messages can be exchanged during capability negotiations such as those described in pages 333-336 of IEEE Std 802.16-2009. Capability negotiations may be performed irrespective of the desired mobile station or base station capabilities to ensure proper interoperability. Successful capability class negotiation involves mobile station and base station supporting a common set of features or capabilities.

In various embodiments, Type/Length/Value may be defined using some of the "reserved values" fields in IEEE Std 802.16-2009 compliant MAC management messages. TLV coding can be used to convey capability index values in SBC-REQ and SBC-RSP messages. The MAC management messages in IEEE 802.16m are distinguished from their legacy counterparts by an "AAI" prefix denoting the "Advanced Air-Interface" messaging. Therefore, these MAC management messages are denoted by AAI_SBC-REQ and AAI_SBC-RSP in the IEEE 802.16m specification.

Various embodiments allow signaling capabilities using a small number of bits as well as a fall back mechanism in case of system failure. Accordingly, issues concerning increased network entry/re-entry delays as well as higher control-plane latency arising from large capability negotiation MAC management messages can be mitigated. Various embodiments reduce an amount of bandwidth used to negotiate capabilities. Disrupted communication is less likely to interfere with capability negotiations.

FIG. 1 shows a wireless communication system involved in a capability configuration session, in accordance with an embodiment. A mobile station 110 transmits a request for capabilities message, shown as SBC-REQ, to base station 120. Base station 120 indicates capabilities to mobile station 110 using an SBC-RSP message. The wireless interface between mobile station 110 and base station 120 may be IEEE 802.16m compliant as specified in the latest ratified version of IEEE 802.16m standard (expected in 2010). Other wireless protocols may be used such as but not limited to 3GPP LTE and LTE-Advanced. In various embodiments, capabilities can be indicated using capability class index.

FIG. 2 depicts an order of capability classes, from class 0 to higher class number N, where $N \geq 0$. A capability class is defined as a unique set of functions, configuration parameters, air-interface protocol revision, and/or services that can uniquely describe a mobile station implementation or configuration while operating in a cellular network. As shown in FIG. 2, the capability classes can be nested so that capability class i+1 includes all features and parameters in capability class i ($i \geq 0$). In some cases, the capability classes i and j ($i \neq j$) can be mutually exclusive where the features and parameters defined in capability class i are fully or partially independent of capability class j. In various embodiments, increasing class number corresponds to increased or enhanced device capability. In various embodiments, the higher the numeric values of a capability index, the more enhanced features are supported.

An entire feature set or configuration parameters supported by the standard or the system profile (e.g., both mandatory and optional features) can be classified into different capability classes. For example, "Capability Class 0" denotes the default configuration corresponding to "CAPABILITY_INDEX=0." The "CAPABILITY_INDEX" values range from 0 to N, where the portioning of the features and the number of capability classes depend on the device classes and other considerations taken into account when developing system profiles or the actual specification. The features and configuration parameters included in the baseline class can be sufficient to meet the minimum performance requirements of the applicable wireless communications standard.

For example, Capability Class 0 indicates a default capability index and basic feature set or configuration parameters and does not need to be signaled. A mobile station by default supports a basic set of features or configuration parameters (e.g., those mandated by a system profile or by the standard specification per se) or air-interface protocol revision. In such case, there would be no need to negotiate and configure the basic capabilities. Therefore, by default the base station can assume that the mobile station supports basic capabilities and no MAC management messages are exchanged if the mobile station or base station is to operate based on the basic capability feature set.

If the mobile station is capable of supporting higher revisions of air-interface (Physical Layer (PHY) or Medium Access Control (MAC) layer) protocols and is to use enhanced features, then the mobile station transmits a MAC management message to the base station using SBC-REQ indicating the highest capability index supported by the mobile station. As an example, the capability class 0 may include parameters related to baseline antenna configurations in the downlink and uplink, baseline multi-antenna mode, minimum transmission bandwidth, and other parameters listed in Section 11 of IEEE Std. 802.16-2009 or other parameters specified in WMF-T23-001-R015v01 MSP-Common-Part, WMF-T23-002-R015v01, MSP-TDD, and WMF-T23-002-R015v01 MSP-FDD system profiles. The capability class 1 may include all features included in capability class 0 plus additional features such as higher multi-antenna mode and minimum transmission bandwidth.

In response to receipt of the MAC management message containing the capability index from the mobile station (e.g., SBC-REQ or AAI_SBC-REQ), the base station determines whether the requested feature set or MAC and/or PHY protocol revisions can be supported. If the base station supports or can allow the use of enhanced features, the base station shall respond with a MAC management message using SBC-RSP (or AAI SBC-RSP) to inform the mobile station of its decision. The base station signals a capability index which is numerically smaller than or equal to that requested by the mobile station.

In the case of failure in any stage of operation, the mobile station and base station shall fall back to "Capability Class 0" and restart negotiations for new "Capability Class", if necessary.

Features of each capability class can be identified or communicated to the mobile station and base station during initial device setup by the operator or vendor or alternatively the device can be programmed or upgraded over the air-interface.

FIGS. 3 and 4 respectively depict SBC-REQ and SBC-RSP message formats from IEEE Std 802.16-2009. In various embodiments, variable sized fields TLV Encoded Information of SBC-REQ and TLV Encoded Attributes of SBC-RSP are used to indicate capability indexes of respective mobile station and base station.

FIG. 5 depicts a process to negotiate capabilities between a mobile station and base station in accordance with an embodiment.

Block 502 includes a mobile station selectively transmitting a capability class index in the event the requested capabilities are above system default. For example, a variable sized TLV Encoded Information field of SBC-REQ (or AAI_SBC-REQ) can be used to transmit a capability class index from the mobile station.

Block 504 includes a base station indicating capability class using an index. The indicated capability class is at or below the requested capability class of the mobile station. For example, a variable sized TLV Encoded Attributes field of SBC-RSP (or AAI_SBC-RSP) can be used to transmit a capability class index from the base station.

Figure 6:
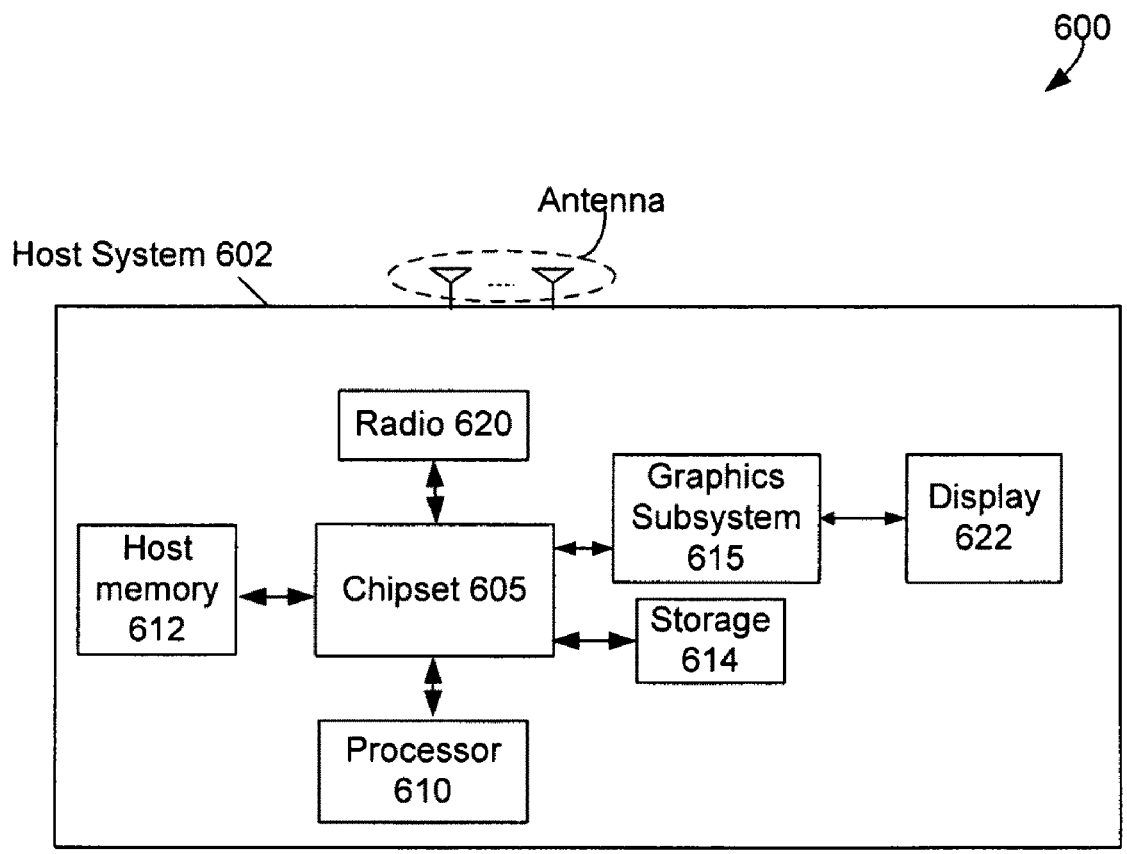
FIG. 6 depicts a system in accordance with an embodiment.

FIG. 6 depicts a system in accordance with an embodiment. Computer system 600 may include host system 602 and display 622. Computer system 600 can be implemented in a handheld personal computer, mobile telephone, set top box, or any computing device. Host system 602 may include chipset 605, processor 610, host memory 612, storage 614, graphics subsystem 615, and radio 420. Chipset 605 may provide intercommunication among processor 610, host memory 612, storage 614, graphics subsystem 615, and radio 420. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fiber Channel (FC), and/or Serial Advanced Technology Attachment (S-ATA).

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, Display Port, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16. In various embodiments, radio 620 performs techniques described with regard to FIG. 1 to negotiate capabilities with a base station. For example, radio 620 may include at least a physical layer interface and media access controller.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable, instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A mobile station comprising:
at least one memory to store capabilities of the mobile station, wherein capabilities relate at least to baseline antenna configurations in a downlink and uplink, baseline multi-antenna mode, and minimum transmission bandwidth;
at least one processor configured to:
selectively initiate capabilities negotiation with a base station using a capabilities index code in response to capabilities of the mobile station being above a default level, wherein the capabilities index code is to represent multiple capabilities of the mobile station, wherein the index code is to represent a capability class, a capability class i+1 to include all features and parameters in capability class i, where $i \geq 0$, and wherein the code is to be transmitted in a Type/Length/Value (TLV) Encoded Information field in an Advanced Air Interface SS basic capability request (AAI-SBC-REQ) message format;
selectively access a second capabilities index code from the base station in response to receipt of the second capabilities index code from the base station, the second capabilities index code is to represent multiple capabilities of the base station, wherein the second capabilities index code is part of a Type/Length/Value (TLV) Encoded Attributes field in an Advanced Air Interface SS basic capability response (AAI-SBC-RSP) message format; and
selectively request to apply capabilities based in part on the received multiple capabilities of the base station in response to negotiation with the base station or to selectively apply default level capabilities independent from capabilities negotiation with the base station.

2. The mobile station of claim 1, wherein the capabilities index code is to define a set of functions, configuration parameters, air-interface protocol revision, and services that indicate the mobile station configuration.

3. The mobile station of claim 1, wherein for capability classes i and j, where $i \neq j$, features and parameters defined in capability class i are fully or partially independent of capability class j.

4. A system comprising:
a display device;

a memory configured to store capabilities of a mobile station, wherein capabilities relate at least to baseline antenna configurations in downlink and uplink, baseline multi-antenna mode, and minimum transmission bandwidth; and at least one processor communicatively coupled to the display device and the memory, the at least one processor configured to:

selectively initiate negotiation of capabilities with a base station using a capabilities index code in response to capabilities of the mobile station being above a default level, the capabilities index code to represent multiple capabilities of the mobile station, the capabilities index code to define functions, configuration parameters, air-interface protocol revision, and services that indicate the mobile station configuration, the capabilities index code transmitted using a Type/Length/Value (TLV) Encoded Information field in an Advanced Air Interface SS basic capability request (AAI-SBC-REQ) message format, selectively access a second capabilities index code in response to receipt of the second capabilities index code from the base station, the second capabilities index code to represent multiple capabilities of the base station and the second capabilities index code received using a Type/Length/Value (TLV) Encoded Attributes field in an Advanced Air Interface SS basic capability response (AAI-SBC-RSP) message format, and selectively apply capabilities based in part on the received multiple capabilities of the base station in response to negotiation with the base station or to selectively apply default level capabilities absent capabilities negotiation with the base station.

5. A computer-implemented method comprising:
selectively transmitting an Advanced Air Interface SS basic capability request(AAI-SBC-REQ) message to a base station, the AAI-SBC-REQ message representing a capability class of the mobile station and the capability class representing multiple capabilities of the mobile station, wherein the transmitting an AAI-SBC-REQ message to a base station comprises:
transmitting an AAI-SBC-REQ message to the base station when the mobile station has capability to operate above a default capability class,
transmitting an AAI-SBC-REQ message to the base station during network entry, network re-entry, or network handover, and
transmitting a highest capability index supported by the mobile station when the mobile station capability is above a default capability;

selectively accessing an Advanced Air Interface SS basic capability response(AAI-SBC-RSP) message from the base station in response to receipt of the AAI-SBC-RSP message, the AAI-SBC-RSP message representing a capability index of the base station and the AAI-SBC-RSP message signaling a capability index that is numerically smaller than or equal to the capability class;

selectively applying capabilities based on a default capability class in response to the mobile station not signaling capability to operate above a default capability class; and selectively applying capabilities based in part on the capability index of the base station in response to receipt of the capability index of the base station.

6. The method claim 5, wherein the capability class is to define a set of functions, configuration parameters, air-interface protocol revision, and services that indicate the mobile station configuration.

7. The method of claim 5, wherein a capability class i+1 to include all features and parameters in capability class i, where $i \geq 0$.

8. The method of claim 5, wherein for capability classes i and j, where $i \neq j$, features and parameters defined in capability class i are fully or partially independent of capability class j.

9. The method of claim 5, wherein the transmitting an AAI-SBC-REQ message to a base station comprises transmitting the code using a Type/Length/Value (TLV) Encoded Information field.

10. The method of claim 5, receiving an AAI-SBC-RSP message from the base station comprises using a Type/Length/Value (TLV) Encoded Attributes field.

11. The method of claim 5, wherein capabilities indicated by the capability class i are selected from a group consisting of:
parameters related to baseline antenna configurations in downlink and uplink, baseline multi-antenna mode, and minimum transmission bandwidth.

12. The method of claim 11, wherein capabilities indicated by an (i+1)th capability index code are selected from a group consisting of:
all features included in capability class i and higher multi-antenna mode and higher minimum transmission bandwidth.

13. The method of claim 5, further comprising:
receiving features of each capability class at the mobile station during initial mobile station device setup.

14. A base station comprising:
at least one memory to store capabilities of the base station, wherein capabilities relate at least to baseline antenna configurations in a downlink and uplink, baseline multi-antenna mode, and minimum transmission bandwidth;

at least one processor configured to:
selectively access capabilities from a mobile station based on a capabilities index code, the capabilities index code from a Type/Length/Value (TLV) Encoded Information field in an Advanced Air Interface SS basic capability request (AAI-SBC-REQ) message format, the capabilities index code to represent multiple capabilities of the mobile station that are above a default capability of the mobile station, and the capabilities index code to define functions, configuration parameters, air-interface protocol revision, and services that indicate a mobile station configuration; and selectively request to transmit capabilities for the base station to the mobile station using a second capabilities index code in response to receipt of the capabilities from the mobile station, the second capabilities index code indicating the capabilities supported by the base station and the logic to selectively request to transmit capabilities for the base station is to selectively request to transmit a second capabilities index code using a Type/Length/Value (TLV) Encoded Attributes field in an Advanced Air Interface SS basic capability response (AAI-SBC-RSP) message format.

15. A non-transitory computer-readable medium, comprising instructions stored thereon, which when executed by a computer, cause the computer to:
initiate storage of capabilities of a mobile station, wherein capabilities relate at least to baseline antenna configurations in a downlink and uplink, baseline multi-antenna mode, and minimum transmission bandwidth;

selectively initiate negotiation of capabilities with a base station using a capabilities index code in response to capabilities of the mobile station being above a default level, wherein the capabilities index code is to represent multiple capabilities of the mobile station, wherein the index code is to represent a capability class, a capability class i+1 to include all features and parameters in capability class i, where i>0, and wherein the code is to be transmitted using a Type/Length/Value (TLV) Encoded Information field in an Advanced Air Interface SS basic capability request (AAI-SBC-REQ) message format;

selectively access a second capabilities index code from the base station in response to receipt of the second capabilities index code from the base station, the second capabilities index code is to represent multiple capabilities of the base station, wherein the second capabilities index code is part of a Type/Length/Value (TLV) Encoded Attributes field in an Advanced Air Interface SS basic capability response (AAI-SBC- RSP) message format; and selectively apply capabilities based in part on the received multiple capabilities of the base station in response to negotiation with the base station or to selectively apply default level capabilities independent from capabilities negotiation with the base station.

16. The computer readable medium of claim 15, wherein the capabilities index code is to define a set of functions, configuration parameters, air-interface protocol revision, and services that indicate the mobile station configuration.

17. The computer readable medium of claim 15, wherein for capability classes i and j, where i≠j, features and parameters defined in capability class i are fully or partially independent of capability class j.

* * * * *